United States Patent [19]

Nakajima et al.

[11] 4,091,357
[45] May 23, 1978

[54] RECEIVING SYSTEM OF TELEMETERING SIGNAL

[75] Inventors: Masaya Nakajima, Neyagawa; Katsumi Tabuchi, Kadoma, both of Japan

[73] Assignee: Matsushita Electric Industrial Co., Ltd., Osaka, Japan

[21] Appl. No.: 707,607

[22] Filed: Jul. 22, 1976

[30] Foreign Application Priority Data

Nov. 20, 1975 Japan .................................. 50/139861

[51] Int. Cl.² ...................... H04B 11/00; G08C 19/26
[52] U.S. Cl. ............................ 340/5 R; 340/177 CA; 340/206
[58] Field of Search ................. 340/5 R, 177 CA, 206

[56] References Cited

U.S. PATENT DOCUMENTS

| | | | |
|---|---|---|---|
| 3,366,881 | 1/1968 | Malone et al. | 340/206 |
| 3,742,472 | 6/1973 | Bryant et al. | 340/177 CA |
| 3,878,502 | 4/1975 | Rochelle | 340/5 R |

*Primary Examiner*—Richard A. Farley
*Attorney, Agent, or Firm*—Wenderoth, Lind & Ponack

[57] ABSTRACT

In a telemeter system using a measuring probe for radiating a sound pulse signal the pulse spacing of which corresponds to information to be measured such as temperature or salinity of various depths in the ocean water, in order to prevent the echo noise signal there is provided an improved receiving system which comprises a one-bit delay circuit, a pair of integrating circuits, a pulse generator and a gate. One of the integrating circuits is controlled by the signal as received and the other is controlled by a one-bit delayed signal derived from the received signal. The pulse generator generates a pulse signal having a predetermined time duration at a predetermined level of the output from the integrating circuit, and that pulse drives the gate, so as to eliminate the echo unexpectedly received during the pulse spacing.

9 Claims, 18 Drawing Figures

RECEIVING SYSTEM OF TELEMETERING SIGNAL

BACKGROUND OF THE INVENTION

This invention relates to a telemeter system for measuring information relating to e.g. ocean water such as temperature or salinity at various depths, and more particularly to a receiving system for such a telemeter system using a measuring probe for radiating an ultrasonic pulse signal. An ultrasonic signal is advantageous because it can be transmitted in water with low loss.

There are various methods for modulating the carrier of an ultrasonic wave in such a telemeter system, and from the standpoint of effective use of transmitting power and simplification of the system, it is advantageous to pulse modulate the ultrasonic signal so as to make the pulse spacing of the sound pulse signal correspond to information to be measured. The inventors have proposed an expendable oceanography probe which can be effectively used in such a telemeter system in copending application Ser. No. 231,702 filed July 15, 1975.

On the other hand, such a system using a sound pulse signal has a defect that it may be distributed by an echo signal. That is, besides a sound pulse signal transmitted straight from a transmitting transducer of a remote measuring device in sea water to a receiving transducer, because of wireless transmitting the radiated sound pulse signal is reflected from various objects such as the shore and the bottom and the surface of the sea and a so-called echo signal is received and causes an error in measurement. Therefore, it is necessary to eliminate the echo signal or to compensate for such an undesirable effect of the echo signal while measuring the pulse spacing, which corresponds to information to be measured, of the received sound pulse signal.

In the prior art, for this purpose there is used an ultrasonic receiver having a very sharp directivity so as to pick up only the signal transmitted straight from the radiating source. However, when the measuring probe moves for example for measuring temperature at various depths, it is required that the receiver always trace the probe correctly and this is almost impossible in practice. Besides, as an electronic signal processing method for eliminating the echo signal, it has been considered to clamp the receiving operation of the receiver for a certain period after arrival of a sound pulse signal. However, under conditions where temperature changes greatly, the pulse spacing of the sound pulse signal also changes greatly and it is almost impossible to set on optimum clamping period. Further, although there has been considered a correlation method of distinguishing the normal signal from the echo signal, this results in a very complex system and is not practical.

Moreover, there is another problem in connection with the measuring probe. That is, it is inevitable that the detecting characteristic of one sensor is different from that of another sensor. For example, when thermistors are used as sensors for detecting temperature, the manner in which the resistance of one of the thermistors changes with a temperature change is not always the same as the manner in which another transistor of the thermistors changes with the same temperature change. Although such deviation can be compensated for by special design of an electronic circuit, it is not desirable, mainly from the point of cost, to add an accurate and complex compensating means to the expandable probe. Therefore, for telemetering information relating to ocean water with use of an expendable probe, usually by measuring the detecting characteristic of each sensor, the sensors having almost the same characteristic are selected and mounted on the probes. Alternatively, by using a calibration chart prepared for each probe, the correct value is obtained for the received signal.

SUMMARY OF THE INVENTION

An object of the present invention is to provide a novel and improved receiving system for a telemeter system using a probe radiating a sound pulse signal the pulse spacing of which corresponds to information relating to characteristics of ocean water to be measured.

Another object of the present invention is to provide a novel and effective circuit configuration for eliminating an undesirable signal such as an echo in a receiving system of the telemeter system as described above.

A further object of the present invention is to provide a novel and effective circuit configuration for compensating for deviation of the detecting characteristic of a sensor mounted on a probe of the telemeter system as described above.

These objects are achieved by providing a receiving system for a telemeter system using a measuring probe for radiating a sound pulse signal the pulse spacing of which corresponds to information to be measured according to the present invention, said receiving system comprising a one-bit delay means, a pair of integrating means, one of said integrating means being controlled by the sound pulse signal as received so as to alternate a charging and discharging operation and the other of said integrating means being controlled by the sound pulse signal delayed by one bit by said one-bit delay means so as to alternate a charging and discharging operation, a pulse generating means for generating a pulse signal having a predetermined time duration when the output signal from said integrating means during the discharging operation reaches at a predetermined level, and a gating means which is driven by the pulse signal from said pulse generating means so as to control the receiving operation of said receiving system.

That is, in the receiving system according to the invention, the pulse spacing of the received sound pulse signal is memorized, and for the successively arriving pulse signal, the receiving gate is opened for a certain time decided by the memorized pulse spacing or the period between the two preceding pulse signals signal so as to eliminate a signal having no correlation to the pulse spacing of the next preceding period. Usually, information relating to ocean water such as temperature or salinity in water does not change abruptly with depth or time, and for a measurement frequency of more than several times per second the measured value at a certain time is near to the value measured at the next preceding time. Therefore, when a pair of pulse signals arriving successively are received, the following pulse signal can be regarded as arriving at a time very near to the pulse spacing of the two preceding pulse signals. By using such a characteristic of measurement in water, the undesirable signals can be effectively eliminated.

Further, according to the present invention, in order to compensate for deviation of the characteristic of the probe owing to deviation of the detecting sensor, the receiving circuit is designed so that the pulse spacing changes almost linearly at a constant rate for the amount to be measured and any deviation of the probe appears as a deviation of the pulse spacing at a certain measured amount such as a certain temperature. On the other hand, operation of the manufactured probe is checked previously at a reference value corresponding to the minimum amount measurable by the probe, and a number representative of the pulse spacing measured at this time is marked on the probe. In the receiving system, the number marked on the probe is pre-set in a pulse spacing measuring circuit, and during measuring this number is subtracted from a similar number corresponding to the pulse spacing of the received signal. Then, deviation of the probe can be compensated for and an accurate measurement can be provided. That is, the receiving system of the invention comprises a loading means for loading a number corresponding to the pulse spacing for a certain measurement of each measuring probe, a complement means for providing a complement of said loaded number, and a counting means for counting the number corresponding to the pulse spacing of the received signal and adding said complement to the counted number.

BRIEF DESCRIPTION OF THE DRAWINGS

These and other objects and the features of the invention will be apparent from the following description of a preferred embodiment of the invention taken in conjuction with the accompanying drawings in which:

FIGS. 2A–2M are pulse diagrams for explaining the operation of the system of FIG. 1;

DETAILED DESCRIPTION OF THE PREFERRED EMBODIMENT

Figure 1:
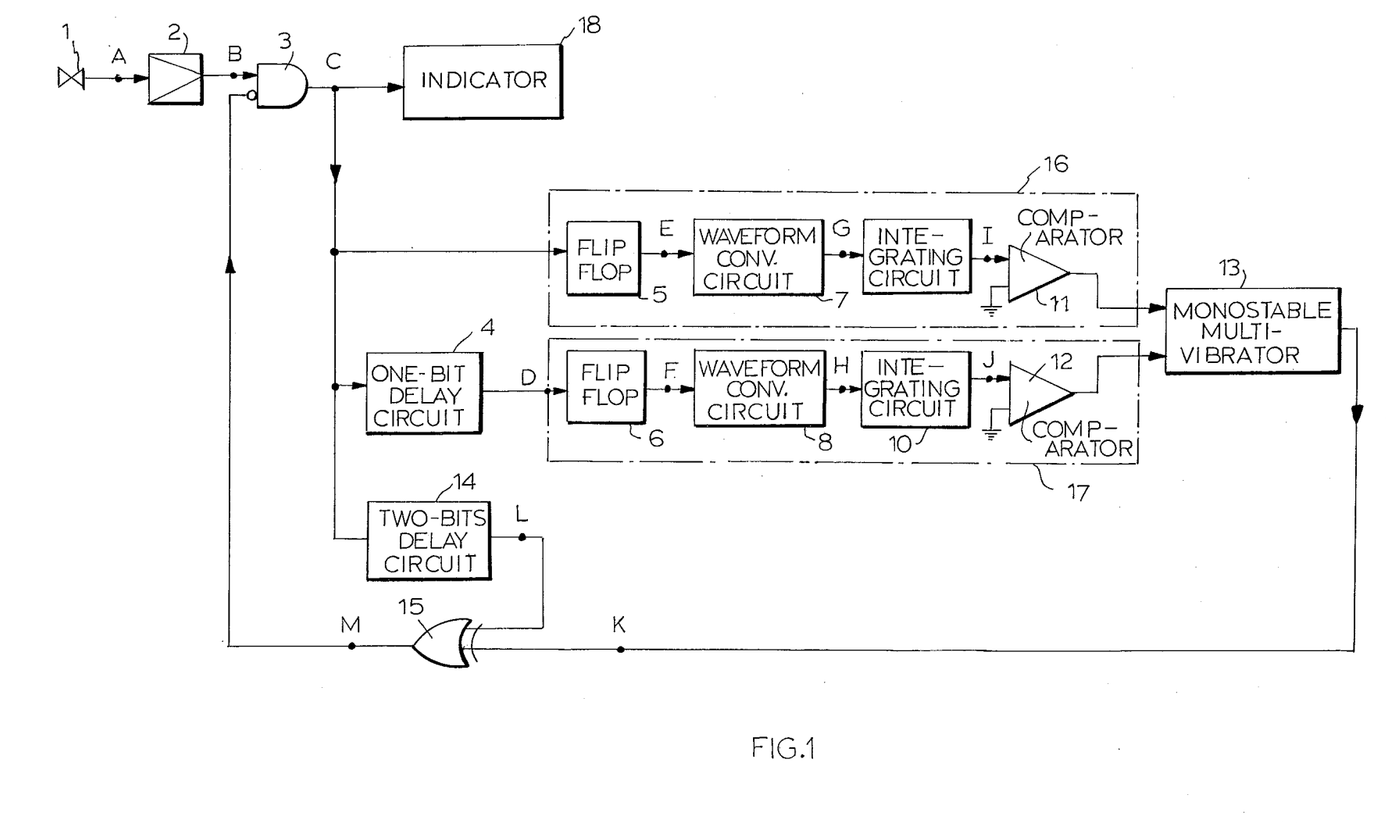
FIG. 1 is a block diagram of an undesirable signal eliminating portion of a receiving system according to the invention.

Referring to FIG. 1 which shows a block diagram of the receiving system of the invention, the sound pulse signal radiated from the probe (not shown) is received by a receiver designated by a reference numeral 1 and it is amplified and wave-shaped by an amplifier 2. In this embodiment, the amplifier 2 is a frequency selective type and its bandwidth is designed so that there is attenuation of $-3dB$ at 1.5 $KH_z$ from the center frequency. This bandwidth is chosen to be an optimum value according to frequency deviation of the probe which is inevitably caused by the method of manufacturing. It is of course desirable that attenuation out of the necessary bandwidth be as large as possible.

FIGS. 2A — 2M show waveforms of the signal at points A to M in FIG. 1. The sound pulse signal A ($p_1$, $p_2$ . . . $p_5$) received by the receiver 1 is amplified and shaped by the amplifier 2 as described above and applied to an input terminal of a gate circuit 3. The other input terminal of the gate circuit 3 is connected to an output terminal of a non-coincidence circuit 15, as shown in FIG. 1. Only when the output from the non-coincidence circuit 15 is at a low level can the amplified and shaped signal B pass through the gate circuit 3 and be applied to input terminals of a flip-flop circuit 5, an indicator 18, a one-bit delay circuit 4 and two-bits shift registor 14, respectively.

Figure 2A:
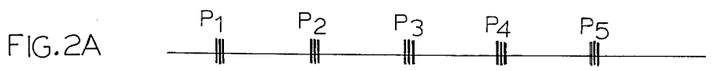
Figure 2B:
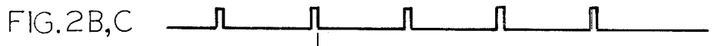
Figure 2D:
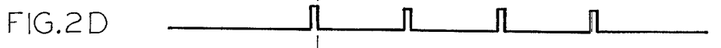
Figure 2E:
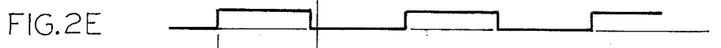
Figure 2F:
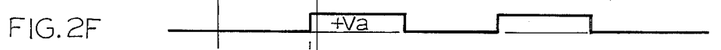
Figure 2G:
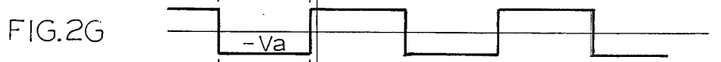
Figure 2H:
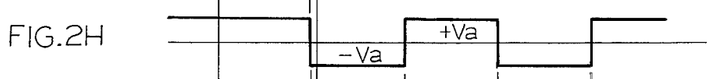
Figure 2I:
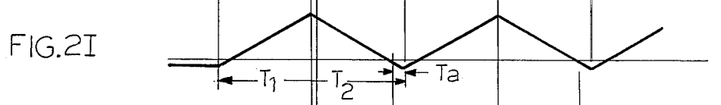
Figure 2J:
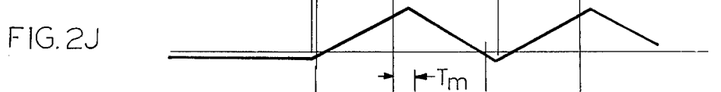

The flip-flop circuit 5 is set to a low level before the above signal is applied thereto, and reverses its output each time the signal is applied, as shown by a waveform E in FIG. 2E. The signal E is applied to a waveform converting circuit 7, and it is converted into a voltage of $+Va$ at the low level of the output E from the flip-flop circuit 5 or a voltage of $-Va$ at the high level of the output E, as shown by waveform G in FIG. 26. An integrating circuit 9 connected to the waveform converting circuit 7 performs a charging operation with the first integrating time constant $\tau_1$ while the output G from the waveform converting circuit 7 is $-Va$, i.e. $T_1$ in FIG. 2I and performs a discharging operation with the second integrating time constant $\tau_2$ while the output G is $+Va$, i.e. $T_2$ in FIG. 2I, where $\tau_1 \geq \tau_2$.

As described above, before the input signal $P_1$ is received, the output E of the flip-flop circuit 5 is held at the low level and the output G of the waveform converting circuit 7 is held at $+Va$, and the output I of the integrating circuit 9 is clamped to a certain minus voltage, for example to $-0.6V$ by using a forward voltage drop of a silicon diode. When the input signal $P_1$ is received with the parts of the circuit in this state, the signal E reverses to the high level and the signal G reverses to $-Va$, and the integrating circuit 9 is charged with the first integrating time constant $\tau_1$ and the signal I increases until the next input signal $P_2$ is received. When the input signal $P_2$ is received, the signals E and G reverse to the low level and $+Va$, respectively, and the signal I is discharged with the second integrating time constant $\tau_2$.

From the relation of $\tau_1 \geq \tau_2$, in the fall mode of the waveform I (corresponding to the time $T_2$ in FIG. 2I), a time when I crosses the zero voltage is prior to the time $T_2$ and I is clamped to $-0.7V$ until the input signal $P_3$ is received. When the input signal $P_3$ is received, similarly to the operation described above, I is charged with the time constant $\tau_1$ and discharged when the input signal $P_4$ is received. This operation is repeated each time when a signal is received. In this operation, the time when the output I of the integrating circuit 9 is discharged and crosses the zero voltage is according to the pulse spacing between the two preceding input signals, e.g. $T_2-Ta$ is according to the time between $P_1$ and $P_2$. Although the time $T_1$ in FIG. 2 changes according to the change of the amount of the value to be measured, the time ($T_2-Ta$) also changes automatically with the change of the time $T_1$. That is, the voltage I crosses the zero voltage at the time prior by $Ta$ to the time when receiving of the next input signal $P_3$ is expected from the pulse spacing between the input signals $P_1$ and $P_2$.

Figure 2K:
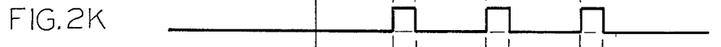

A comparator 11 in FIG. 1 compares the voltage I from the integrating circuit 9 with the zero voltage and reverses its output when the voltage I crosses the zero voltage. The output of the comparator 11 is applied to an input terminal of a monostable multivibrator 13 which generates a pulse signal K as shown in FIG. 2K. That is, the monostable multivibrator 13 generates the pulse signal only when the voltage I crosses the zero voltage from the positive to the negative side. The time when the pulse signal K is generated is ($T_2-Ta$) as described above, and its pulse width $T_m$ is set to be $Tm=2Ta$.

Figure 3:
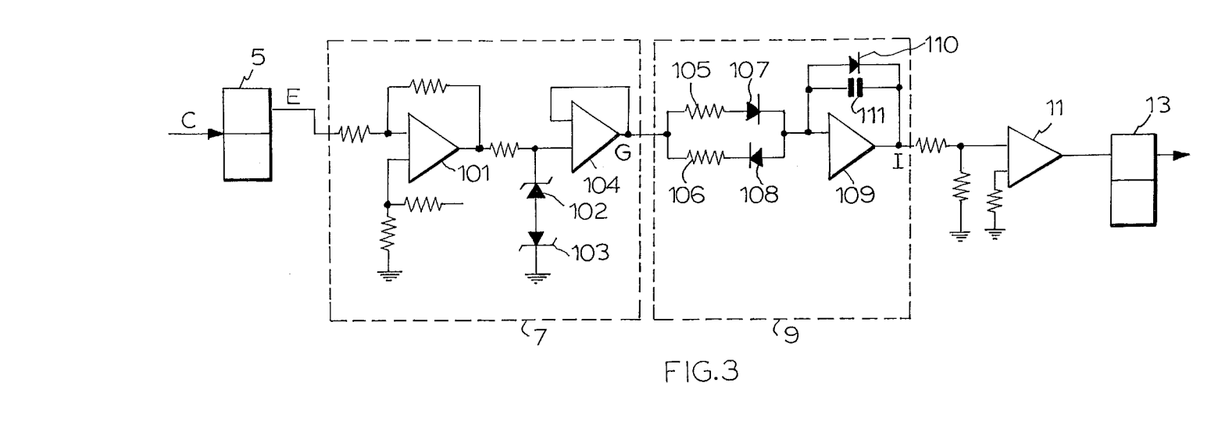
FIG. 3 is a circuit diagram of a part of a practical embodiment of the system of FIG. 1.

FIG. 3 shows a circuit diagram of a practical embodiment of the part of the receiving system described hereinbefore, in which the output E of the flip-flop circuit 5 driven by the signal C is applied to the waveform shaping circuit of the amplitude limiting type which comprises two operational amplifiers 101 and 104 and two zener diodes 102 and 103. The output of the operational amplifier 101 is in the reverse phase to that of the input signal E thereof, and its level is fixed to $+Va$ or $-Va$ when the constant voltage of the zener diode is $|Va|$. The other operational amplifier 104 acts as a buffer amplifier. The integrating circuit 9 comprises an operational amplifier 109, a capacitor 111 in parallel therewith, a series connection of a resistor 106 and a diode 108 for governing the integrating time constant $\tau_1$ when the output G is $-Va$, and a series connection of a resistor 105 and a diode 107 in parallel with resistor 106 and diode for governing the integrating time constant $\tau_2$ when the output G is $+Va_2$. When the output voltage I of the integrating circuit 9 is negative, its level is held nearly to $-0.6V$ by a diode 110 connected in parallel with amplifier 109. Operational amplifier 11 is the comparator and its output drives the monostable multivibrator 13.

On the other hand, the one-bit delay circuit 4 connected to the gate circuit 3 supplies an output signal D from the gate circuit 3, which is delayed by one-bit as shown in FIG. 2D, to a flip-flop circuit 6. A block 17 is constituted by a series connected flip-flop circuit 6, waveform converting circuit 8, integrating circuit 10 and comparator 12 which operates similarly to the block 16 constituted by the series connected parts from the flip-flop circuit 5 to the compartor 11 described hereinbefore. That is, as apparent from comparison of the outputs I and J of the integrating circuits 9 and 10, the operation of the block 17 is delayed by one cycle from the operation of the block 16. The output of the block 17 is applied to the monostable multivibrator 13.

Figure 2L:
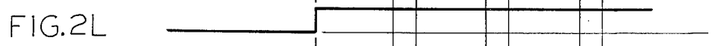
Figure 2M:
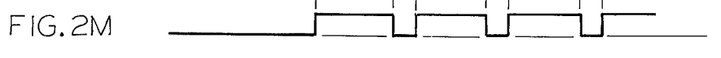

From the third input signal, the monostable multivibrator 13 generates a pulse signal K, shown in FIG. 2K having a pulse width $+Ta$ the center of which is at the position corresponding to the pulse spacing of one period prior, and the signal K is applied to one of input terminals of the non-coincidence circuit 15. The other input terminal of the non-coincidence circuit 15 is connected to the output of the two-bits shift register 14. Output $L_1$ of the two-bits shift register 14 is reversed from the low level to the high level by the second pulse signal from the gate circuit 3 and held at the high level until a reset signal is applied thereto, as shown in FIG. 2L. The non-coincidence circuit 15 detects non-coincidence of the output signals of the two-bits shift register 14 and the monostable multivibrator 13, and its output M changes as shown in FIG. 2L. That is, it is at a low level until the second input signal and reverses to a high level after the second input signal, and then it returns to the low level only when the monostable multivibrator 13 generates the output pulse. This output of the non-coincidence circuit 15 is applied to the inhibit input terminal of the gate circuit 3, and so the input signal B passes through the gate circuit 3 only when the signal M is at the low level.

As understood from the description presented hereinbefore, from the third input signal on, the only signal which can pass through the gate circuit 3 is an input signal existing during the period $+Ta$ the center of which is at the position corresponding to the pulse spacing of one period prior. Therefore, an undesirable noise signal existing at a time other than the above period can not pass through the gate circuit 3, and the signal appearing at the output of the gate circuit 3 is only the normal signal. Thus the measuring means 18 can measure and indicate accurate information not influenced by noise. Because temperature or salinity in the ocean water usually does not change abruptly with time, from the pulse spacing of the input signal of one period prior, the arriving time of the next input signal can be estimated nearly correctly, as described hereinbefore, and no noise and pseudo signals can be effectively eliminated. When the value to be measured, and thus the pulse spacing of the arriving pulse signals change comparatively abruptly, the method of eliminating noise according to the present invention can be effectively used by adjusting and widening the pulse width of the output pulse of the monostable multivibrator.

Figure 4:
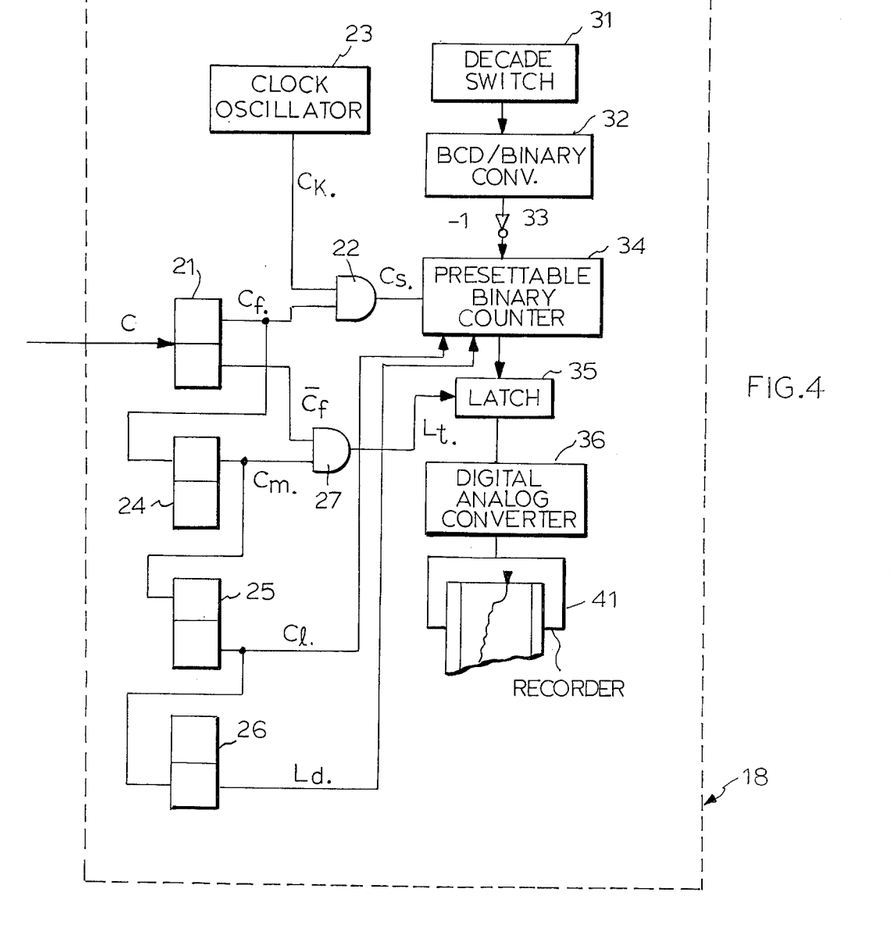
FIG. 4 is a block diagram of a counting and indicating portion of the receiving system according to the invention.
Figure 5:
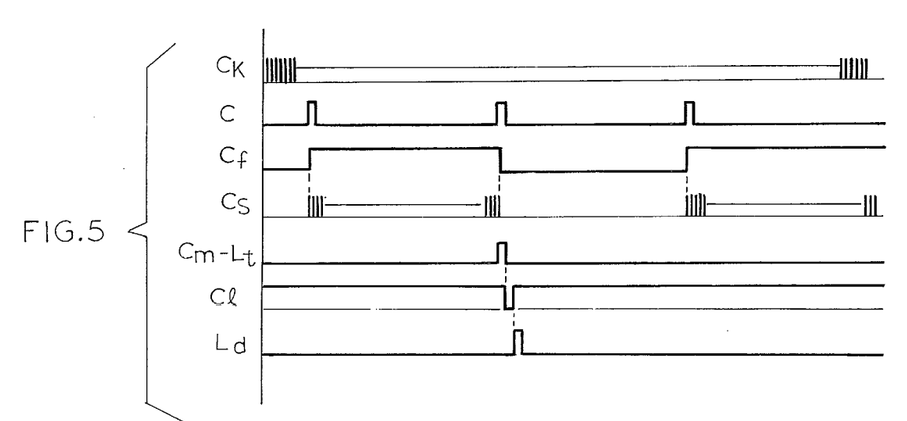
FIG. 5 is a timing diagram for explaining the operation of the system of FIG. 4.

The measuring means 18 receives the normal signal C from which noise is eliminated by the method as described hereinbefore, and it counts and indicates the pulse spacing corresponding to the detected amount by suitable means. FIGS. 4 and 5 show an embodiment of the measuring means 18 and a timing chart of the operation thereof, respectively. The noise free signal C is applied to a flip-flop circuit 21, and its output $Cf$ is at a high level and a low level repeating alternately according to the arrival of the pulse signal C, as shown in FIG. 5. The signal $Cf$ is applied to one of two input terminals of a gate 22. The other input terminal of the gate 22 is connected to a clock oscillator 23. In this embodiment, the clock oscillator generates a frequency of 10 KHz. An output $Ck$ of the clock oscillator is applied to the gate 22, and the clock signal is supplied to a counter 34 as a signal $Cs$ through the gate 22 during the high level of the signal $Cf$, that is the period corresponding to the pulse spacing of the arriving pulse signal. Then, the signal $Cs$ is counted by the counter 34. On receiving the next arriving signal C, the output of the flip-flop circuit 21 is changed to the low level and the counting of the counter 34 stops. In this state, the number indicated by the counter 34 corresponds to the pulse spacing of the pulse signal C. This is transferred to a latch circuit 35 and converted into an output of analog voltage through a digigal-analog converter 36. The converted voltage is indicated and recorded by a voltage recorder 41. A conventional pen recorder using a roll of paper is suitable as the recorder 41 used in the invention. When the expendable probe disclosed in the aforesaid copending application of the inventors is used for example for measuring temperature at various depths, the depth of the ocean and temperature are conveniently indicated by the length of the paper and the recorded voltage, respectively. As a latch signal Lt for transferring the number counted by the counter 34 to the latch circuit 35, by using an output $C_m$ of a monostable multivibrator 24 which is driven by the fall of the output $Cf$ of the flip-flop circuit 21 and the conjugate output $\overline{Cf}$ of Cf, there is provided a signal (Cm-Lt) through AND gate 27 just after the end of the counting. Further, the output Cm of the monostable multivibrator 24 drives a monostable multivibrator 25 so as to generate a clear signal Cl for clearing the counter 34 which has finished the counting.

Figure 6:
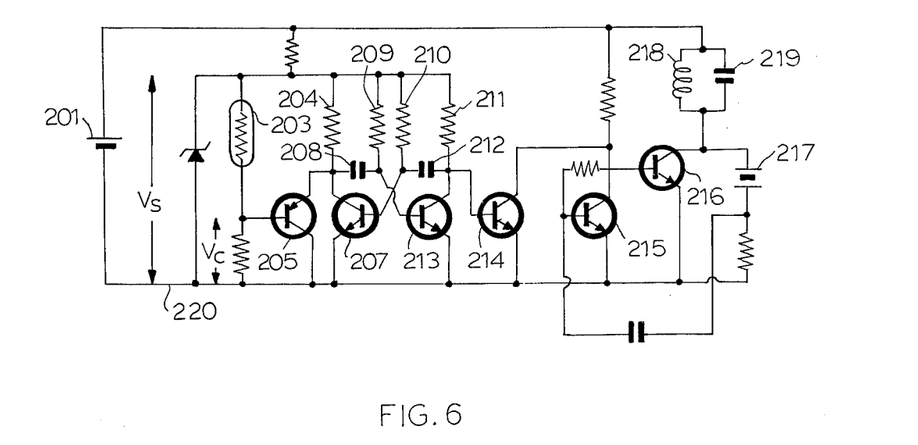
FIG. 6 is a circuit diagram of a measuring probe used for the telemeter system according to the invention.

As described hereinbefore, the measuring system of the invention is designed so that the pulse spacing changes almost linearly for a change of the value to be detected and the deviation of each probe results in a deviation of the pulse spacing at a certain measured amount, e.g. at a certain temperature. This is made possible, for example, by using a circuit of the measuring probe, as shown in FIG. 6, in which an oscillating circuit oscillating at a resonant frequency of an electroacoustical transducer 217 is formed by transistors 215 and 216, coil 218 and capacitor 219 together with the transducer 217 and peripheral circuit elements, and the output of this oscillating circuit is radiated in the ocean water as a sound signal from the transducer 217. For telemetering of this invention, this sound signal should be modulated to a pulse signal having a pulse spacing which changes according to the amount to be measured such as the temperature of the water. In FIG. 6, transistors 207, 213 and 206 form a well-known voltage controlled oscillator composed mainly of a collector voltage clamped astable multivibrator. Oscillating frequency of the astable multivibrator comprising the transistors 207 and 213 is proportional to a collector voltage Vc of the transistor 207 and thus to a voltage between a base voltage of the transistor 206 and the ground line 220. This voltage is provided by dividing a voltage Vs, which is stabilized by a zener diode 202, by resistors 203 and 205.

In an embodiment of FIG. 6, a temperature sensitive resistor, i.e. a thermistor, is used as the resistor 203. The resistance R of a thermistor is expressed by an equation (1)

$$R = R_o \exp B \left( \frac{1}{T} - \frac{1}{T_o} \right) \quad (1)$$

where $R_O$ is the resistance of the thermistor at room temperature $T_O$ and B is a so-called thermistor constant. Then, the voltage $V_c$ is expressed as follows $$V_c = \frac{Ra}{R + Ra} Vs \quad (2)$$

where $Ra$ is the resistance of the resistor 205. When the resistor 205 of $Ra = 31.4$ KΩ and the thermistor 203 having the values of $R_O = 31.4$ KΩ ($T_O = 20°$ C) and $B = 4000°$ K are used, the voltage $V_c$ at $V_s = 10$ V can be approximated well by the following equation:

$$Vc(T_O + \Delta T) \doteq 4.26 + 0.114 \Delta T - 0.0000206 \Delta T^3. \quad (3)$$

That is, the voltage $V_c$ changes almost linearly for the change of temperature from a center at room temperature. The above approximation is sufficient for expected temperature range of 0° to 40° C in measuring temperature of the ocean water.

Figure 7:
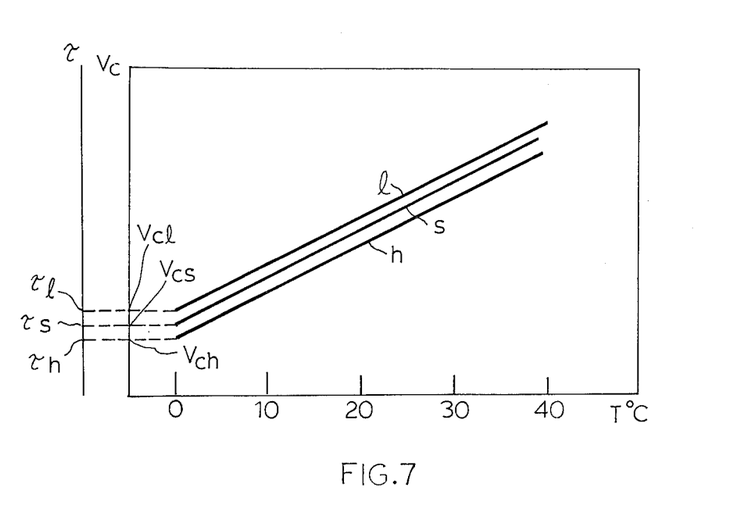
FIG. 7 is a graph showing characteristics of temperature vs. pulse spacing for various measuring probes.

Usually, it is more difficult to control deviation of the resistance $R_O$ of the thermistor at room temperature than to control deviation of the constant B of the thermistor. The deviation of the resistance $R_O$ at room temperature results in deviation of the voltage $V_c$ at the same room temperature corresponding to the first term of the equation (3), and so results in deviation of the pulse spacing of the radiated sound pulse signal for the same room temperature. On the other hand, the second term of the equation (3) governing the a gradient of change of the voltage $V_c$ for change of temperature is almost entirely governed by the constant B, and it is hardly influenced at all by a change of the resistance $R_O$. Accordingly, the characteristic of temperature vs. change of the voltage $V_c$ for deviation of the resistance $R_O$ changes parallel with that of the standard condition with the same gradient, as shown in FIG. 7. In FIG. 7, the horizontal axis shows the temperature of a thermistor used as a sensor, and the vertical axes show the voltage $V_c$ in FIG. 6 and the oscillating period, i.e. pulse spacing, of the multivibrator composed of the transistors 207 and 213. When the line S of FIG. 6 is the characteristic provided by a thermistor having the standard resistance $R_{Os}$ at room temperature, the line $l$ is the characteristic provided by a thermistor having the lower resistance $R_O$ at room temperature than the standard resistance $R_{Os}$ and the line $h$ is for a higher resistance $R_O'$ than the standard one.

In the measuring means described above referring to FIG. 4, it is necessary to compensate for such deviation of the characteristic of temperature vs. pulse spacing, shown in FIG. 7, due to deviation of the resistance of the thermistor at room temperature. In FIG. 4, the compensation is performed by a decade switch 31, BCD/binary converter 32, inverter 33 and the presettable binary counter 34. As described hereinbefore, the clock oscillator 23 generates clock pulses at a frequency of 10 KH$_Z$. Therefore, when the pulse spacing is counted in the units of milliseconds (corresponding to 1 KH$_Z$), one tenth of the number of the clock pulses counted by the counter 34 as described hereinbefore corresponds to the pulse spacing of the signal to be measured. When the measuring probe including the circuit shown in FIG. 6 is manufactured and adjusted, the pulse spacing at the minimum value of measurement, e.g. 0° C in this embodiment, is previously measured and the number of clock pulses corresponding to that pulse spacing is marked on the surface of the probe. When using the telemeter system of the invention, this number for the probe being used is set in the decade switch 31 shown in FIG. 4. This set number is converted into a binary number by the BCD/binary converter and further converted into the complement by the inverter 33, and then the complement is loaded into the presettable counter 34 as an initial value. Therefore, when counting the aforesaid signal $C_s$, when the counter counts the clock signals corresponding to the number set by the decade switch, its output becomes zero. That is, the above number is subtracted from the counted number, and the minimum temperature of the measuring range is indicated. When further clock signals arrive the number counted beyond zero by the counter 34 is provided as the output and this indicates the correctly compensated measured value. As a signal for loading the number set by the decade switch 31 into the presettable counter 34, an output L$d$ of a monostable multivibrator 26 which is driven by the signal c$l$ for clearing the counter 34 is provided just after the counter 34 is cleared.

What is claimed is:

1. A receiving system for a telemeter system using a measuring probe for radiating a sound pulse signal the pulse spacing of which corresponds to information to be measured, said receiving system comprising a one-bit delay means, a pair of integrating means, one of said integrating means being controlled by the sound pulse signal as received so as to carry out an alternate charging and discharging operation and the other of said integrating means being coupled to said one-bit delay means and being controlled by the sound pulse signal delayed by one bit by said one-bit delay so as to carry out an alternate charging and discharging operation, a pulse generating means coupled to said integrating means and said further integrating means for generating a pulse signal having a predetermined time duration when the output signal from said integrating means during the discharging operation arrives at a predetermined level, and a gating means coupled to said pulse generating means which is driven by the pulse signal from said pulse generating means so as to control the receiving operation of said receiving system.

2. A receiving system according to claim 1, wherein each of said integrating means comprises a flip-flop circuit, one flip-flop circuit being triggered by the sound pulse signal as received and the other flip-flop circuit being connected to said one-bit delay means and triggered by the one-bit delayed sound pulse signal, an amplifier connected to said flip-flop circuit for generating positive and negative voltage outputs of a predetermined level according to the two kinds of output levels of said flip-flop circuit, and an integrating circuit coupled to the amplifier for integrating the output signal from said amplifier.

3. A receiving system according to claim 1, wherein said integrating means comprises an integrating circuit having an integration time constant $\tau_1$ at negative input which is larger than an integration time constant $\tau_2$ at positive input.

4. A receiving system according to claim 1, wherein said integrating means comprises an integrating circuit having a high gain D.C. amplifier, a capacitor connected between the output terminal and the input terminal thereof and which is opposite in phase to the output of said D.C. amplifier, a pair of parallel connected diodes connected to the input terminal of said amplifier in reverse directions to each other, and two parallel resistors having different resistance values from each other and each being connected at one end thereof in series with said diodes, respectively and in common, at the other ends thereof, to a terminal to which the signal is provided.

5. A recieving system for a telemeter system using a measuring probe for radiating a sound pulse signal the pulse spacing of which corresponds to information to be measured, said receiving system comprising a pulse generating means for generating timing pulses, a loading means for loading a number of said timing pulses corresponding to the pulse spacing for a certain measurement of each measuring probe, a complement means coupled to said loading means for providing a complement of said loaded number of timing pulses, and a counting means coupled to said complement means for counting a number corresponding to the pulse spacing of the received signal and adding said complement to the counted number.

6. A receiving system according to claim 5, wherein said certain measurement is the minimum amount measurable by the probe.

7. A receiving system according to claim 5, wherein said loading means comprises a set of decade switches.

8. A receiving system according to claim 5, wherein said complement means comprises a code converter for converting the loaded number into a binary number and an inverter for a binary number.

9. A receiving system according to claim 5, wherein said counting means comprises a presettable binary counter for presetting a complement in a binary number.

* * * * *